(12) United States Patent
Daniell et al.

(10) Patent No.: US 7,023,259 B1
(45) Date of Patent: Apr. 4, 2006

(54) HIGH VOLTAGE SWITCH WITH NO LATCH-UP HAZARDS

(75) Inventors: Philip M. Daniell, Newbury (GB); Grahame K. Reynolds, Lordswood (GB)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/793,359

(22) Filed: Feb. 26, 2001

(51) Int. Cl.
*G05F 3/02* (2006.01)

(52) U.S. Cl. ........................................ 327/536; 327/537

(58) Field of Classification Search ................ 327/536, 327/537, 157, 374, 375, 382, 383; 307/110; 363/59, 60
See application file for complete search history.

(56) References Cited

U.S. PATENT DOCUMENTS

| | | | | |
|---|---|---|---|---|
| 5,029,063 A | * | 7/1991 | Lingstaedt et al. | 363/60 |
| 5,159,204 A | * | 10/1992 | Bernacchi et al. | 327/439 |
| 5,270,588 A | * | 12/1993 | Choi | 326/88 |
| 5,436,587 A | * | 7/1995 | Cernea | 327/536 |
| 5,521,546 A | * | 5/1996 | Kim | 327/536 |
| 5,521,547 A | * | 5/1996 | Tsukada | 327/537 |
| 5,550,486 A | * | 8/1996 | Sweeney et al. | 326/14 |
| 5,852,552 A | * | 12/1998 | Kwon | 363/60 |
| 5,880,620 A | * | 3/1999 | Gitlin et al. | 327/534 |
| 5,939,928 A | * | 8/1999 | Le et al. | 327/390 |
| 5,943,226 A | * | 8/1999 | Kim | 363/60 |
| 5,999,020 A | * | 12/1999 | Volk et al. | 327/67 |
| 6,008,689 A | * | 12/1999 | Au et al. | 327/534 |
| 6,184,594 B1 | * | 2/2001 | Kushnarenko | 397/109 |
| 6,198,340 B1 | * | 3/2001 | Ting et al. | 327/536 |
| 6,198,342 B1 | * | 3/2001 | Kawai | 327/536 |
| 6,208,196 B1 | * | 3/2001 | St. Pierre | 327/536 |

\* cited by examiner

*Primary Examiner*—Timothy P. Callahan
*Assistant Examiner*—An T. Luu
(74) *Attorney, Agent, or Firm*—Marger Johnson & McCollom, P.C.

(57) ABSTRACT

The present invention discloses a method and system of generating and delivering a high voltage signal without latch-up hazards and without incurring a voltage drop due to the threshold of the switching element. The utilization of NMOS elements when switching a high voltage signal may remove latch-up hazards. Switching of the high voltage signal may be accomplished without incurring a voltage drop in the signal. With multiple transistors, switching of a high voltage signal in accordance with the present invention may provide an output driven to a destination circuit on each phase wherein clock cycles may be overlapping and non-overlapping.

13 Claims, 3 Drawing Sheets

HIGH VOLTAGE SWITCH WITH NO LATCH-UP HAZARDS

FIELD OF THE INVENTION

The present invention relates generally to high voltage charge pumps and more specifically to a high voltage switch with no latch-up hazards.

BACKGROUND OF THE INVENTION

It is well known in the art to generate a high voltage from a low voltage to program and erase programmable elements. A high voltage charge pump is utilized to generate a high voltage on-chip while a high voltage switch is connected to the high voltage charge pump and is utilized to apply a positive and negative voltage. The high voltage switch may be utilized to apply the high voltage signal to a memory cell, for example an EEPROM or Flash EEPROM, or another type of destination circuit.

High voltage charge pumps according to the Dickson design known to the art pump charges from node to node from the supply node to the output node. Complementary clock signals may control charging and discharging of capacitors which produce the pumping of the electric charges. The voltage increases from node to node until reaching the final voltage on the output node. Unfortunately, this style of charge pump does not work well with low input voltages and is inefficient.

High voltage switches known to the art are subject to several limitations. First, high voltage switches known to the art are subject to latch-up hazards. Some high voltage switches utilize both NMOS and PMOS elements. As a result, these high voltage switches may be subject to latch-up hazards. Other high voltage switches known to the art may incur a voltage drop due to the threshold of the switching element. This problem may be solved by increasing the input voltage signal and/or adjusting the characteristics of the components, however, the chip may conduct to ground as the chip may not be capable of supporting the higher input voltage.

Consequently, it would be advantageous if a method and system existed for generating and applying a high voltage signal without latch-up hazards and without incurring a voltage drop due to the threshold of the switching element. It would also be advantageous if a method and system existed for switching a high voltage signal while providing a continuous output drive on multiple clock phases.

SUMMARY OF THE INVENTION

Accordingly, the present invention is directed to a method and system of generating and delivering a high voltage signal without latch-up hazards and without incurring a voltage drop due to the threshold of the switching element. The method and system of the present invention may utilize NMOS elements when switching a high voltage signal. Switching of a high voltage signal in accordance with the present invention may provide an output driven to a destination circuit wherein the clock cycles may be overlapping and non-overlapping.

It is to be understood that both the foregoing general description and the following detailed description are exemplary and explanatory only, and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made to a presently preferred embodiment of the invention, an example of which is illustrated in the accompanying drawings.

Figure 1:
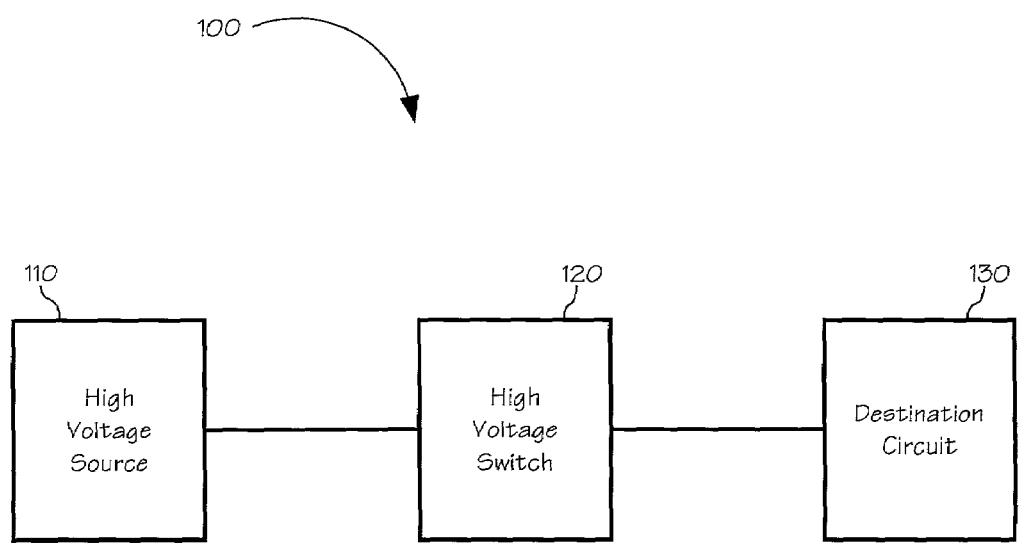
FIG. 1 depicts an exemplary embodiment of a system for delivering a high voltage signal to a destination circuit in accordance with the present: invention.

Referring now to FIG. 1, an embodiment of a system 100 for generating and delivering a high voltage signal to a destination circuit is shown. The high voltage switch 120 may be utilized with various high voltage source 110 in order to switch a high voltage signal to a destination circuit 130. A high voltage source may be in the form of a high voltage charge pump. In an another embodiment, the high voltage switch may he placed upon a chip and the chip may have a high voltage pin serving as the high voltage source. The high voltage switch 120 may be utilized for programming and erasing programmable elements of a memory cell.

An advantageous aspect of the high voltage switch 120 of the present invention is the ability to switch the high voltage signal generated by the high voltage source 110 without incurring a voltage drop due to the threshold of the switching element. For example, if a voltage Vx is generated by the high voltage source 110, a voltage approximately equal to Vx may be delivered to a destination circuit 130 by the high voltage switch 120 of the present invention. High voltage switches known to the art may be capable of providing an input voltage less the threshold voltage of the switching element. High voltage switches known to the art may include a diode in series with the input lead causing a voltage drop across the diode. In order to accommodate for the loss of voltage due to the switching element, the input voltage must be increased by at least the amount of the threshold of the switching element. Increasing the amount of internal voltage in the high voltage switches increases the possibility of a breakdown of the overall chip causing the chip to conduct to ground.

Figure 2:
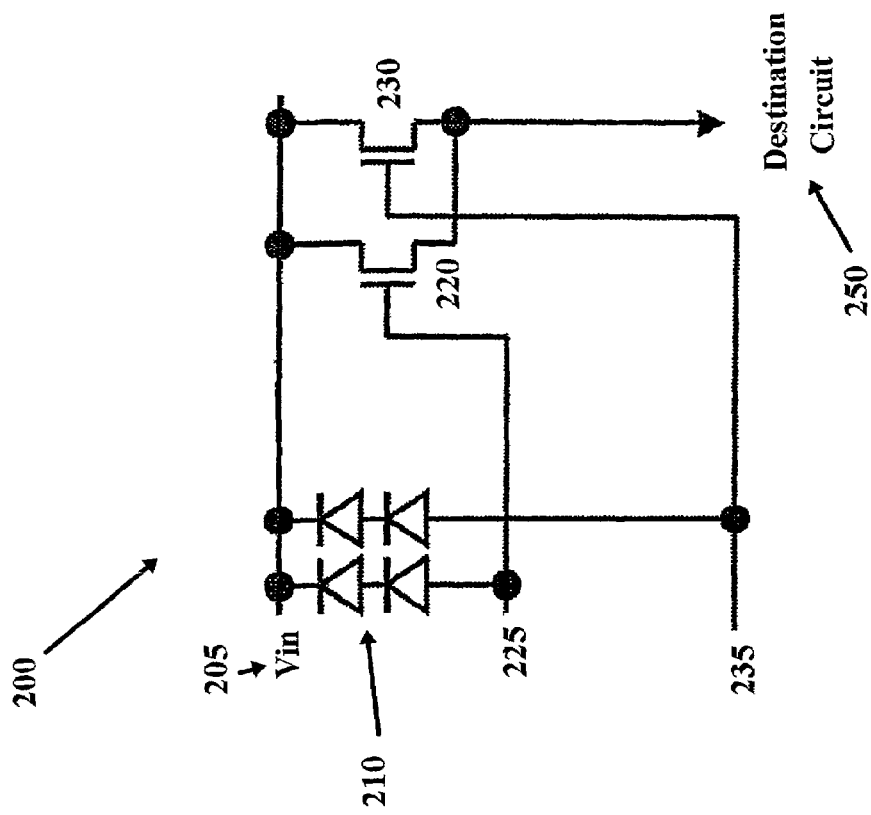
FIG. 2 depicts an exemplary embodiment of a high voltage switch in accordance with the present invention.

Referring now to FIG. 2, an exemplary embodiment of a high voltage switch 200 in accordance with the present invention is shown. The high voltage switch of the present invention may be capable of operating without latch-up hazards as all of the transistors may be high voltage n channel metal-oxide-silicon transistors (NMOS) transistors. High voltage switches known to the art may utilize p channel metal-oxide-silicon (PMOS) transistors and NMOS transistors which may cause latch-up hazards. The functionality of the diodes 210 may be advantageous as it may prevent the internal voltage from getting too high to destruct the overall chip. In a preferred embodiment, the diodes may be in the form of NMOS transistors with a short between the gate and drain of the transistors. Utilization of the diodes may not be required to achieve the functionality and benefits of the high voltage switch of the present invention, thus incorporation of the high voltage switch without the diodes would not depart from the scope and spirit of the present invention. Further, other methods and devices of preventing a high internal voltage may be applied by one of ordinary skill in the art without departing from the scope and spirit of the present invention.

In an embodiment of the present invention, the high voltage switch may include multiple NMOS transistors. A first transistor 220 may have a drain connected to Vin 205 and a gate connected to a first input lead 225. Vin 205 may be the input voltage from a high voltage charge pump designed to increase the voltage of Vin 205 whereby the high voltage switch 200 may be utilized to apply the higher voltage to a destination circuit 250. A second transistor 230 may have a drain connected to Vin 205 and a gate connected to a second input lead 235. The source of each of the first and second transistors 220, 230 may be connected to the destination circuit 250 for application of the high voltage signal. The utilization of multiple NMOS transistors may be highly advantageous as it may allow the high voltage switch of the present invention to provide a continuous output drive. For example, if the high voltage switch 200 operates utilizing multiple phases, 180 degrees out of phase for example, the output may be driven on each phase regardless of whether the phases are overlapping or non-overlapping. On non-overlapping cycles, output may be driven continuously.

Figure 3:
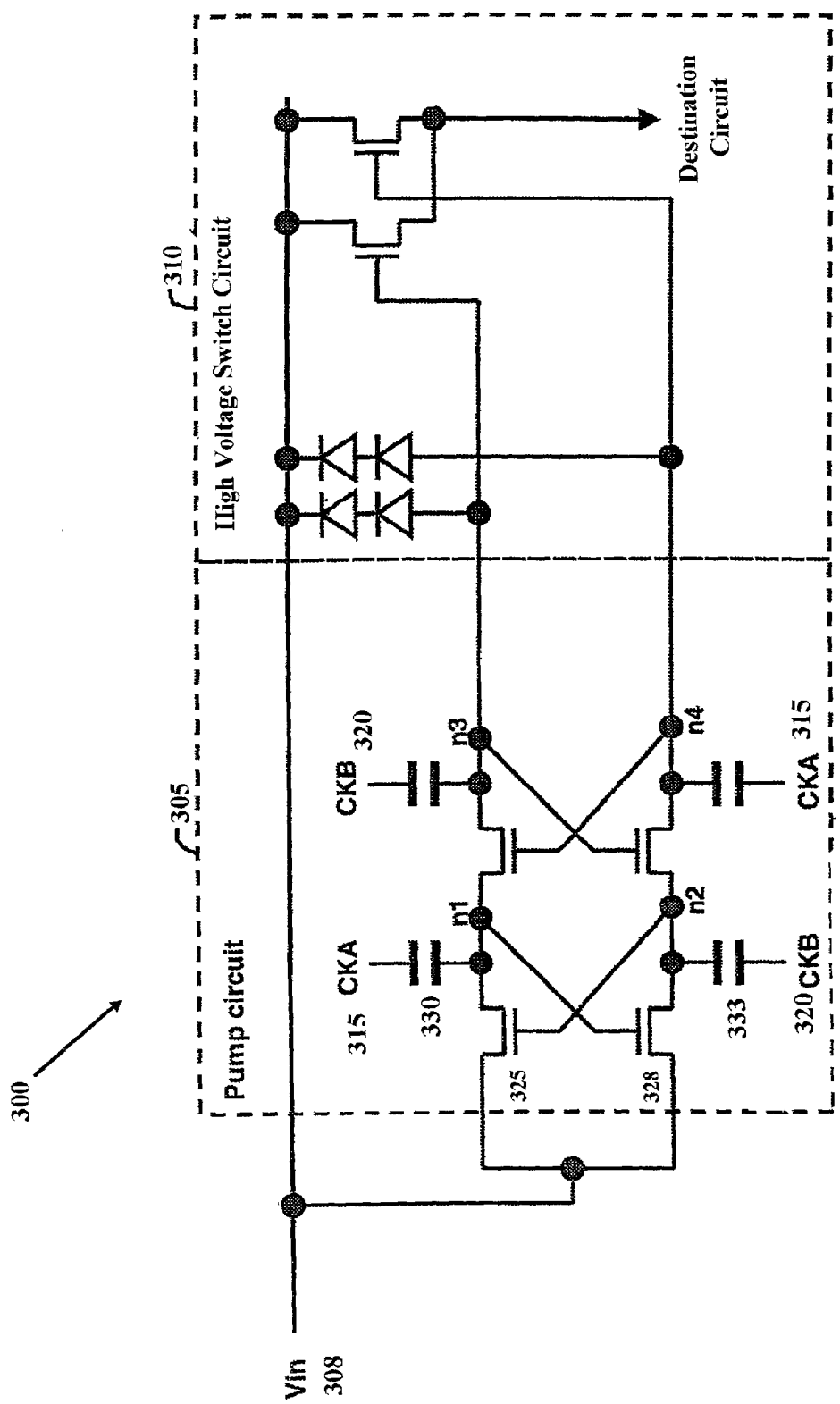
FIG. 3 depicts an exemplary embodiment of a high voltage pump and switch in accordance with the present invention.

Referring now to FIG. 3, an embodiment of a high voltage delivery system 300 including a high voltage charge pump 305 and high voltage switch 310 in accordance with the present invention is shown. The high voltage pump 305 of the present invention may provide a positive and negative high voltage to program and erase programmable elements which operates efficiently at normal and low voltages, may require less pump stages, has a small die area, and may have a low break-down voltage requirement.

The high voltage charge pump 305 may be capable of increasing the voltage provided by a voltage supply Vin 308. A pair of transistors 325, 328 may form a stage pair. Each of the pair of transistors 325, 328 may be connected to Vin 308. A gate of each of the transistors 325, 328 may be connected to an opposite side of the stage pair. Cross-coupling of the stage pairs is advantageous as it may allow an efficient generation of electric charges while preventing the charges from flowing backwards.

Capacitors 330, 333 may be utilized to charge and discharge based upon the cycles generated by Clock A 315 and Clock B 320. Preferably, Clock A 315 and Clock B 320 are 180 degrees out of phase to provide a continuous output at a destination circuit. Charges may be fully transferred from one stage to the next stage alternately between opposite sides of the pump stage pairs. The high voltage charge pump 305 of the present invention is not limited to two stages as shown in FIG. 3, rather the voltage charge pump may include a single stage, three stages, and a plurality of stages depending upon the desired output voltage required for the destination circuit.

The high voltage switch 310 of the present invention may be connected to the high voltage charge pump to apply a high voltage to a destination circuit without any latch-up hazards. The high voltage switch 310 as shown in FIG. 3 is substantially similar to the high voltage switch as shown in FIG. 2. As a voltage signal is produced by the high voltage charge pump 305 in a cyclical fashion, each transistor of the high voltage switch 310 may operate in tandem to provide a continuous output driven on multiple clock phases. An advantage of the high voltage switch of the present invention is the low sensitivity to clock waveforms. The clocks may be overlapping or non-overlapping and may still provide an output driven on each phase.

Referring once again to FIG. 2, the first and second input leads 225, 235 may be connected to a side of a stage pair. Thus, as the high voltage charge pump is producing a voltage signal, the transistors 220, 230 may operate in tandem to provide a continuous output. While the high voltage switch of the present invention is shown with the charge pump of the design a shown in FIG. 3, one of ordinary skill may utilize the high voltage switch of the present invention with other types and varieties of charge pumps without departing from the scope and spirit of the present invention. Further, the design of the high voltage switch of the present invention being only an exemplary embodiment wherein other circuits may be designed by one of ordinary skill in the art to obtain the benefits of the high voltage switch of the present invention without departing from the scope and spirit of the present invention.

Although the invention has been described with a certain degree of particularity, it should he recognized that elements thereof may be altered by persons skilled in the art without departing from the spirit and scope of the invention. It is believed that the method and system for the present invention and many of its attendant advantages will be understood by the foregoing description, and it will be apparent that various changes may be made in the form, construction, and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A high voltage delivery system, comprising:
a high voltage charge pump having outputs, the high voltage charge pump configured to be directly connected to a voltage supply having a first voltage level, the charge pump configured to produce a high voltage signal having a second voltage level that is greater than the first voltage level; and
a high-voltage switch circuit configured to deliver the high voltage signal to a destination circuit, the hi-voltage switch circuit including NMOS transistors having sources, drains and gates, the sources directly connected to each other, the drains directly connected to the voltage supply, and each of the gates directly connected to one of the outputs of the high voltage charge pump, the high-voltage switch capable receiver circuit, the delivery circuit capable of providing a continuous output to said destination circuit unaffected by latch-up hazards.

2. The high voltage delivery system of claim 1, the high voltage charge pump comprising a stage pair, one of the NMOS transistors directly connected to a first side of the stage pair and another one of the NMOS transistors directly connected to second side of the stage pair.

3. A high voltage delivery system, comprising:
a voltage supply;
means for pumping electric charges alternately between a first side and a second side of a stage pair from the voltage supply to generate a high voltage signal, the stage pair having a first side and a second side; and
means for delivering said high voltage signal to a destination circuit, the delivery means including at least two NMOS transistors, each of the at least two NMOS transistors having a gate that is directly coupled to one of the first or second sides of the stage pair, the delivery means capable of providing a continuous output unaffected by latch-up hazards and capable of providing the high voltage signal to the destination circuit.

4. The high voltage delivery system of claim 3, the pumping means including at least two pump stage clocks operating 180 degrees out of phase.

5. The high voltage delivery system of claim 4, the delivery means configured to provide the continuous output to the destination circuit regardless of whether the at least two pump stage clocks are overlapping or non-overlapping.

6. The high voltage delivery system of claim 3, wherein the stage pair consists of two transistors, a gate of one of the two transistors directly coupled to a source of another one of the two transistors.

7. A circuit, comprising:
   a charge pump circuit, including
      a voltage supply providing an input voltage;
      at least one pair of transistors forming a stage pair, each of said at least one pair of transistors connected to said voltage supply, a gate of each of said at least one pair of transistors being coupled to an opposite side of said stage pair;
      at least two capacitors; each of said at least two capacitors being coupled to a side of said stage pair; and
      at least two pump stage clocks capable of creating a multiple phase cycle for charging and discharging of each of said at least two capacitors, each of said at least two pump stage clocks being coupled to said each of said at least two capacitors; and
   a high voltage delivery circuit including
      a first delivery transistor, said first delivery transistor being connected to a first side of said stage pair and said voltage supply, and
      a second delivery transistor, said second delivery transistor being connected to a second side of said stage pair and said voltage supply, wherein said charge pump circuit is capable of increasing said input voltage from said voltage supply to a higher voltage signal, said high voltage delivery circuit being suitable for applying said higher voltage signal to a destination circuit, said high voltage delivery circuit being unaffected by latch-up hazards and being capable of providing a continuous output.

8. The circuit as claimed in claim 7, wherein said first and second delivery transistors are NMOS transistors.

9. The circuit as claimed in claim 7, wherein said at least two pump stage clocks creates at least two phases wherein said at least two phases are at least one of overlapping and non-overlapping while an output is being driven on each phase of said at least two phases.

10. The circuit of claim 7, wherein the at least two pump stage clocks operate 180 degrees out of phase.

11. A voltage delivery system comprising:
   a charge pump circuit having outputs, the charge pump circuit structured to be connected to a voltage source having a first voltage level, the charge pump circuit structured to produce a voltage signal having a second voltage level that is greater than the first voltage level;
   a first NMOS transistor that is directly connected to the voltage source and an output of the charge pump circuit; and
   a second NMOS transistor that is directly connected to the voltage source and another output of the charge pump circuit, the second NMOS transistor also directly connected to the first NMOS transistor, the first NMOS transistor and the second NMOS transistor are configured to provide a continuous output to a destination circuit that is unaffected by latch-up hazards.

12. The voltage delivery system of claim 11, the charge pump circuit comprising a stage pair, the first NMOS transistor directly coupled to a first side of the stage pair, the second NMOS transistor directly coupled to a second side of the stage pair.

13. The voltage delivery system of claim 12, the stage pair consisting of two transistors, a gate of one of the two transistors directly coupled to a source of another one of the two transistors.

* * * * *